(12) United States Patent
Martin et al.

(10) Patent No.: US 9,915,231 B2
(45) Date of Patent: Mar. 13, 2018

(54) LASER HEATING SYSTEM

(71) Applicant: Ford Global Technologies, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 184 days.

(21) Appl. No.: 14/746,496

(22) Filed: Jun. 22, 2015

(65) Prior Publication Data
US 2015/0285193 A1 Oct. 8, 2015

Related U.S. Application Data

(62) Division of application No. 13/296,091, filed on Nov. 14, 2011, now Pat. No. 9,109,525.

(51) Int. Cl.
| | |
|---|---|
| *F02M 27/06* | (2006.01) |
| *F02P 23/04* | (2006.01) |
| *F02B 23/10* | (2006.01) |
| *F02M 31/18* | (2006.01) |
| *F02D 41/04* | (2006.01) |
| *F02D 41/06* | (2006.01) |
| *F02N 19/04* | (2010.01) |
| *F02D 13/02* | (2006.01) |
| *F02D 19/08* | (2006.01) |
| *F02B 75/12* | (2006.01) |

(52) U.S. Cl.
CPC ........... *F02M 27/06* (2013.01); *F02B 23/104* (2013.01); *F02D 41/047* (2013.01); *F02D 41/064* (2013.01); *F02M 31/18* (2013.01); *F02M 31/183* (2013.01); *F02N 19/04* (2013.01); *F02B 2075/125* (2013.01); *F02D 13/0207* (2013.01); *F02D 13/0219* (2013.01); *F02D 19/084* (2013.01); *F02D 2200/0606* (2013.01); *F02D 2250/02* (2013.01); *Y02T 10/123* (2013.01); *Y02T 10/125* (2013.01); *Y02T 10/126* (2013.01); *Y02T 10/36* (2013.01)

(58) Field of Classification Search
CPC ........... F02P 23/04; F02P 15/08; F02P 23/045
USPC ............. 123/143 B, 298, 536, 538, 543, 557
See application file for complete search history.

(56) References Cited

U.S. PATENT DOCUMENTS

| | | | |
|---|---|---|---|
| 5,876,195 A * | 3/1999 | Early | F23N 5/082 123/143 B |
| 2002/0185097 A1 | 12/2002 | Ryan, III | |
| 2003/0041844 A1* | 3/2003 | Yoshimoto | F02B 51/06 123/543 |
| 2006/0027217 A1 | 2/2006 | Yasukawa et al. | |
| 2006/0260580 A1* | 11/2006 | Yoshimoto | F02B 23/0654 123/143 B |
| 2006/0260581 A1* | 11/2006 | Yoshimoto | F02B 17/005 123/143 B |
| 2007/0221748 A1* | 9/2007 | Hornby | F02M 31/125 239/135 |
| 2010/0218739 A1 | 9/2010 | Herden et al. | |

(Continued)

*Primary Examiner* — Sizo Vilakazi
(74) *Attorney, Agent, or Firm* — Julia Voutyras; McCoy Russell LLP

(57) ABSTRACT

A method for vaporizing fuel is provided. The method comprises heating the fuel in a cylinder of an engine via radiation to vaporize the fuel without ignition. In this way, the fuel may be heated to increase vaporization efficiency prior to ignition.

20 Claims, 8 Drawing Sheets

(56) References Cited

U.S. PATENT DOCUMENTS

2010/0275867 A1 11/2010 Weinrotter et al.
2011/0180030 A1 7/2011 Martin et al.

* cited by examiner

LASER HEATING SYSTEM

CROSS REFERENCE TO RELATED APPLICATIONS

The present application is a divisional of U.S. patent application Ser. No. 13/296,091, entitled "LASER HEATING SYSTEM," filed on Nov. 14, 2011, the entire contents of which are hereby incorporated by reference for all purposes.

FIELD

The present disclosure relates to a laser for heating fuel in an engine.

BACKGROUND AND SUMMARY

Efficient combustion in a cylinder of an engine may depend on a number of factors, including complete vaporization of the fuel and homogenization of the vaporized fuel with the intake air. Incomplete vaporization and/or mixing may lead to reduced fuel economy, poor emissions, and unstable combustion events, such as misfire.

Various approaches have been taken to improve combustion efficiency. Fuel may be heated prior to reaching the cylinder, however, this may actually reduce engine efficiency, as the heat may escape to other components, such as the fuel line. Further, heating fuel outside of the cylinder may increase the risk of explosion, due to the volatile nature of the fuel.

The inventors have recognized the issues with the above approaches and offer a method to at least partly address them. In one embodiment, a method for vaporizing fuel comprises heating the fuel in a cylinder of an engine via radiation to vaporize the fuel without ignition.

In this way, radiation may be used to heat the fuel in the cylinder to the vaporization point of the fuel, to improve vaporization prior to ignition. In one example, a laser heating system may direct laser energy to the cylinder to heat the fuel as it is injected. One or more parameters of the laser energy, such as a focus location of the laser energy, amount, and/or duration of the laser energy, may be adapted based on operating conditions such as engine temperature and cylinder pressure. By doing so, the minimal amount of energy needed to vaporize fuel, directed in a location optimized for vaporization and homogenization, may be used to improve engine efficiency and reduce emissions upon subsequent ignition of the fuel, whether through spark-ignition, compression ignition, or other ignition approaches.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
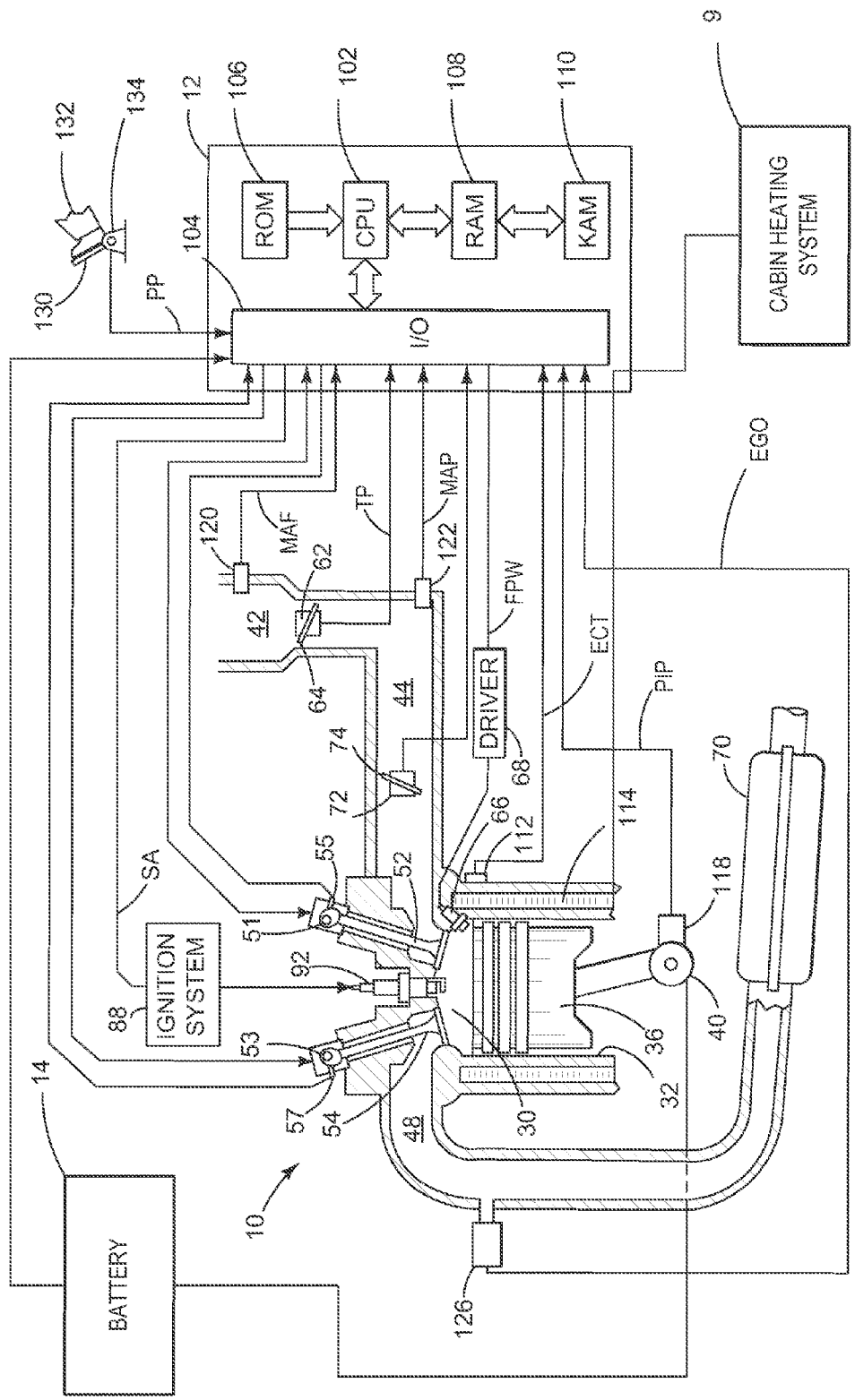
FIG. 1 shows an example cylinder of a multi-cylinder engine.
Figure 3:
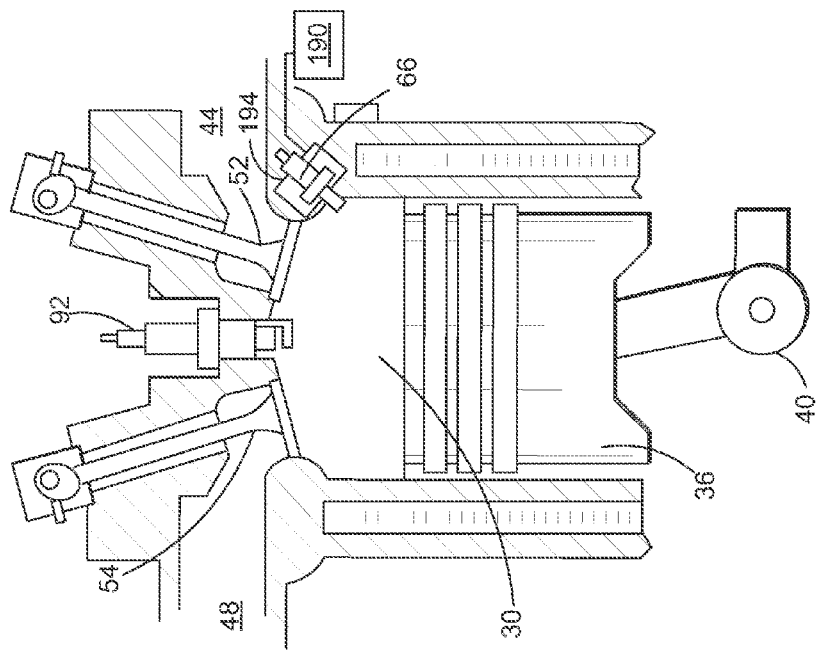
FIG. 3 shows another embodiment of the cylinder of FIG. 1 including a laser heater coupled to an injector.
Figure 2:
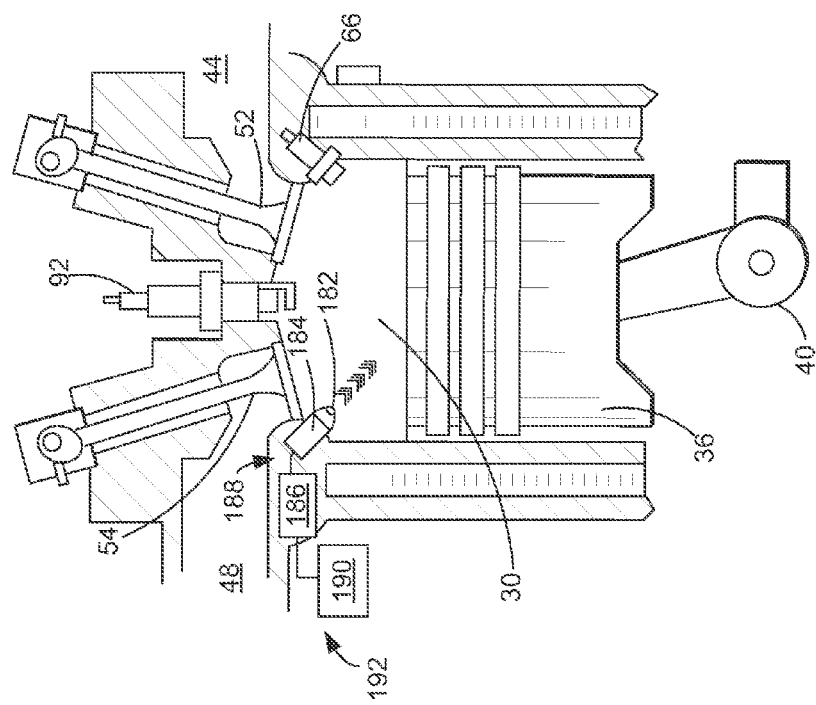
FIG. 2 shows an embodiment of the cylinder of FIG. 1 including a laser heating system.
Figure 4:
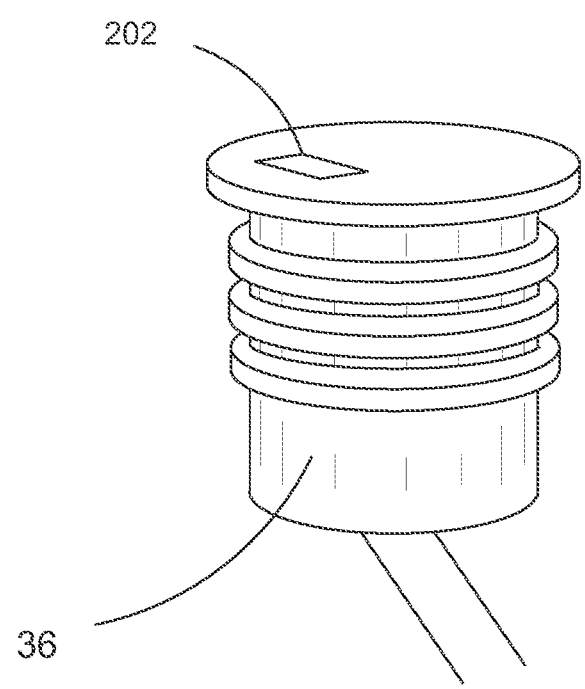
FIG. 4 shows an embodiment of the cylinder of FIG. 1 including an adaptable reflective region.

To improve fuel vaporization, particularly during cold engine conditions, radiation may be used to direct heat to injected fuel, improving fuel vaporization without igniting the fuel. FIG. 1 shows an example engine including a cylinder, spark ignition system, and fuel injector. FIGS. 2-4 show various embodiments of the cylinder of FIG. 1 including a mechanism for heating the fuel in the cylinder via radiation and a mechanism for heating fuel in an injector via a laser heater. FIGS. 5-9 illustrate various control routines that may be carried out by a control system of the engine of FIG. 1.

Referring specifically to FIG. 1, it includes a schematic diagram showing one cylinder of multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. A battery 14 may be coupled to the engine 10 via an alternator (not shown) and one or more shafts or pulleys. The battery 14 may store electricity produced from the rotation of the engine via the alternator, and may discharge the energy in order to power engine components, such as the starter motor.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof. The engine cooling sleeve 114 is coupled to the cabin heating system 9.

As described above, FIG. 1 shows only one cylinder of a multi-cylinder engine, and each cylinder may similarly include its own set of intake/exhaust valves, fuel injector, etc.

Under certain conditions, such as during cold engine start conditions, the fuel that is injected into the cylinder for combustion may be cold, hampering efficient vaporization and homogenization. In some embodiments, the fuel may be heated by a radiation heat source. FIGS. 2 and 3 depict two example embodiments for heating the fuel via a radiation heat source. FIG. 2 depicts an embodiment for directly heating fuel in a cylinder via radiation, while FIG. 3 depicts an embodiment for heating fuel in an injector using a laser heater coupled to an injector. Both FIG. 2 and FIG. 3 depict the cylinder 30 as shown in FIG. 1. While not shown in FIGS. 2 and 3, it is to be understood that the other components described with respect to FIG. 1 may be included in the embodiments depicted in FIGS. 2 and 3.

FIG. 2 shows a laser heating system 192 that includes a laser exciter 188 and a laser control unit (LCU) 190. LCU 190 causes laser exciter 188 to generate laser energy. LCU 190 may receive operational instructions from controller 12. Laser exciter 188 includes a laser oscillating portion 186 and a light converging portion 184. The light converging portion 184 converges laser light generated by the laser oscillating portion 186 on a laser focal point 182 of combustion cylinder 30.

Laser heating system 192 may direct laser energy to one or more locations of the combustion cylinder 30 during or immediately following fuel injection. In one example, laser heating system 192 may direct laser energy to the fuel at the location adjacent to the fuel injector tip, in order to provide the injected fuel with the laser energy. This laser energy may heat up the fuel, causing it to vaporize. Laser heating system 192 may be configured to be controlled by the controller 12 via LCU 190 in order to provide a particular amount of laser energy to the combustion cylinder 30 for a duration and at a location optimized for efficient fuel vaporization, without igniting the fuel. Once vaporized, the fuel may be ignited by the spark ignition system 88.

Laser heating system 192 is configured to adjust one or more laser operating parameters depending on cylinder conditions. For example, laser energy may be utilized for heating the injected fuel during an intake and/or power stroke of the engine, including during engine cranking, engine warm-up operation, and warmed-up engine operation. Fuel injected by fuel injector 66 may form an air-fuel mixture during at least a portion of an intake stroke, where vaporization of the fuel with laser energy generated by laser exciter 188 increases homogenization of the fuel to form an air/fuel mixture that may be more efficiently combusted when ignited by the ignition system.

LCU 190 may direct laser exciter 188 to focus laser energy at different locations depending on operating conditions. For example, LCU 190 may direct laser exciter 188 to focus laser energy at a default location based on the position and angle of the fuel injector 66. This default position may be adjusted based on the cylinder pressure, swirl of intake air within the cylinder, timing of the intake and exhaust valve opening, etc.

Using laser heating system 192 for heating may occur selectively and may be performed in response to a temperature, for example the engine coolant temperature (ECT). In one example, LCU 190 may direct laser exciter 188 to focus laser energy only during fuel injection when the ECT is below a threshold. Further, LCU 190 may direct laser exciter 188 to focus laser energy only during fuel injection when the battery state of charge is above a threshold level. In doing so, the amount of energy used to operate the laser heating system 192 may be minimized.

Controller 12 controls LCU 190 and has non-transitory computer readable storage medium including code to adjust the location of laser energy delivery based on cylinder pressure, for example based on a position of the piston 36 relative to top dead center (TDC). Laser energy may be directed at different locations within cylinder 30. Controller 12 may also incorporate additional or alternative sensors for determining the operational mode of engine 10, including additional temperature sensors, pressure sensors, torque sensors as well as sensors that detect engine rotational speed, air amount and fuel injection quantity. Additionally or alternatively, LCU 190 may directly communicate with various sensors, such as Hall effect sensor 118, for determining the operational mode of engine 10.

FIG. 3 shows an embodiment for heating fuel via a laser heater. In this embodiment, a laser heater 194 is positioned around injector 66. The laser heater 194 may be configured to direct laser energy to the injector 66, for example to the tip of the injector where the fuel is released. Similar to the laser heating system 192 described above with respect to FIG. 2, the laser heater 194 may have a laser exciter. In the embodiment depicted, the laser exciter is integrated within the laser heater 194. Additionally, a laser control unit 190 may be provided to control the amount of laser energy provided to the laser heater 194, as well as the timing and duration of the provided laser energy.

While FIGS. 3 and 4 depict embodiments for fuel heating systems using laser energy, in some embodiments, maser energy may be used rather than laser energy. Masers are configured to emit microwave energy, which may be lower in energy than the radiation emitted by a laser. As such, masers may be able to heat the fuel to the vaporization point without risk of ignition. Further, masers may utilize less energy than lasers and thus may be more fuel-efficient and cost-effective.

FIG. 4 illustrates an example of a piston 36 which may be included in engine 10. The piston of FIG. 4 includes a movable reflective region 202, shown herein as located on the top surface of piston 36. Movable reflective region 202 may be of a variety of suitable sizes or shapes that can be accommodated by piston 36 and cylinder 30. Additionally, piston 36 may be associated with more than one movable reflective region 202. To facilitate a greater distribution of laser light energy throughout combustion cylinder 30, one or more reflective regions 202 may assist laser heating system 192 with heating the injected fuel by redirecting laser light energy to a plurality of different cylinder locations. The dynamic nature of the one or more reflective regions 202 allows the reflective regions 202 to be utilized in some situations (e.g., during heating) and inaccessible in other situations (e.g., during combustion or when heating is no longer advantageous), although in another embodiment, the one or more reflective regions 202 may be static yet non-obstructive to laser exciter 188 focusing laser energy at the first position for igniting an air/fuel mixture. One or more reflective regions 202 may be positioned elsewhere within combustion cylinder 30 to assist with the redirection of laser light energy and thus facilitate a greater distribution of laser light energy within combustion cylinder 30. Alternatively, in another embodiment, the laser exciter 188 may generate and direct laser energy without the aid of reflective regions 202 present within combustion cylinder 30.

Figure 5:
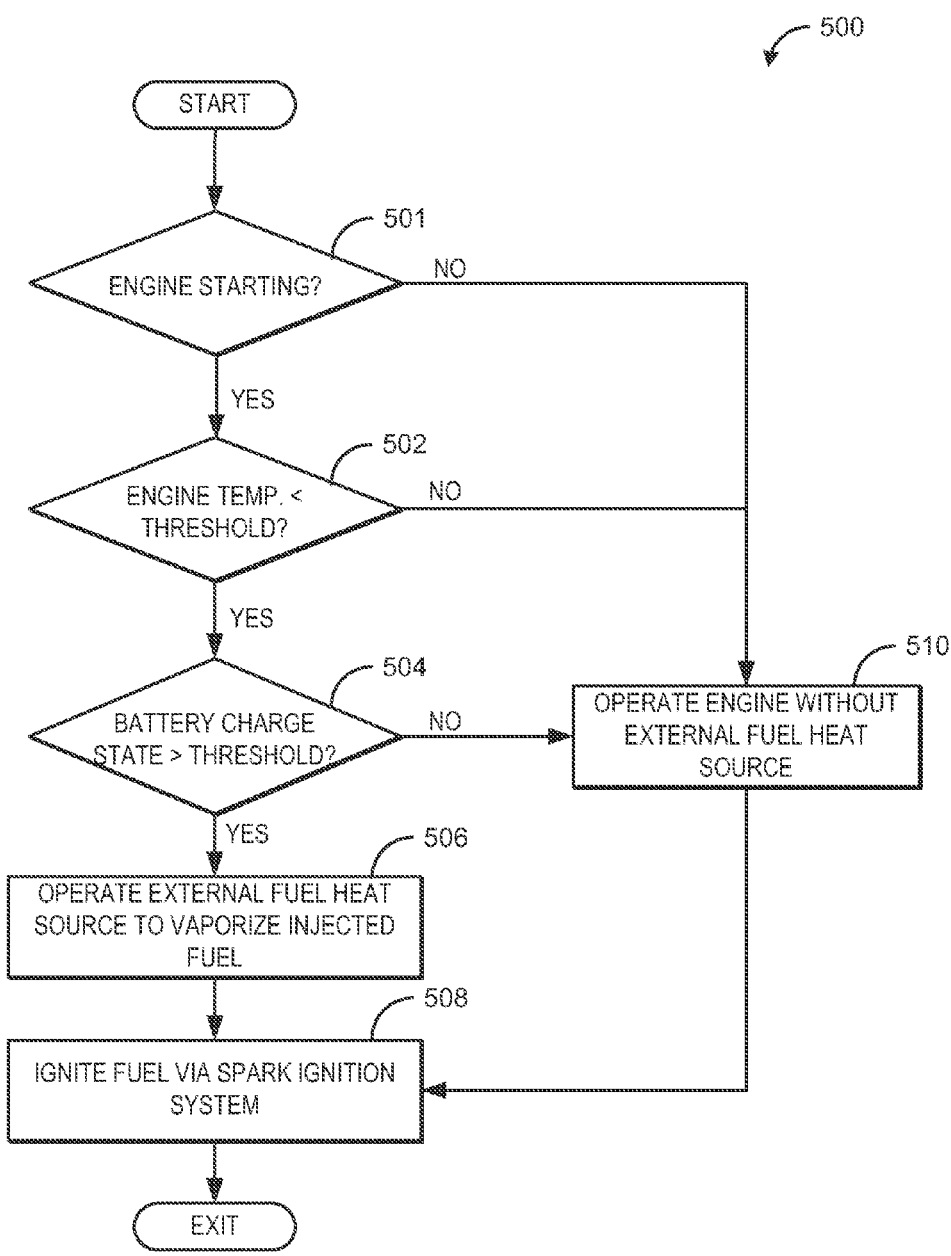
FIG. 5 shows a flow chart illustrating a method for heating fuel via an external fuel heat source according to an embodiment of the present disclosure.

FIG. 5 illustrates a method 500 for operating an external fuel heat source. Method 500 may be carried out by a vehicle control system, such as controller 12, in response to engine conditions that indicate enhanced vaporization of fuel by a heat source may be used to efficiently vaporize the fuel. Such conditions include engine starts, particularly cold engine starts. Thus, at 501, method 500 includes determining if the engine is starting. During an engine start, the engine and fuel may be cold, contributing to poor fuel vaporization which may increase emissions. If the engine is not starting, for example, if the engine has started previously and is running, method 500 proceeds to 510 to operate the engine without heating the fuel with an external heat source, as the heat produced by the engine may heat the fuel enough to efficiently vaporize the fuel. As used herein, "external fuel heat source" may include heat sources other than the heat generated by combustion and associated waste heat, such as a laser heating system coupled to the cylinder.

If the engine is starting, method 500 proceeds to 502 to determine if engine temperature is below a threshold. Engine temperature may be inferred based on the engine coolant temperature (ECT) determined by sensor 112, for example. The threshold may be a suitable threshold under which fuel may not vaporize efficiently, such as ambient temperature, or a specific temperature such as 100° F. If the answer is no, and engine temperature is not below the threshold, method 500 proceeds to 510 to operate (e.g., continue starting) the engine without heating the fuel with an external heat source.

If the answer is yes, and the engine temperature is below the threshold, method 500 proceeds to 504 to determine if the battery state of charge is greater than a threshold. The battery charge state may be determined by monitoring the current flowing into and out of the battery, battery voltage, battery temperature, battery age, or various combinations thereof, for example. If the battery charge state is not greater than the threshold, e.g., greater than 30%, the energy to operate the external fuel heat source may place too large a burden on the battery and electrical system, particularly during engine cold starting where the starter and/or other components may generate a significant electrical load already. Thus method 500 proceeds to 510 to operate (e.g., start) the engine without using the external fuel heat source. If the charge state is above the threshold, method 500 proceeds to 506 to operate the external fuel heat source in order to heat the fuel to improve vaporization. As explained above with respect to FIGS. 2 and 3, the external heat source may be a laser or maser heating system that provides radiation energy directly to the fuel following fuel injection into the cylinder. In other embodiments, the external heat source may be a laser or maser heater coupled to the injector that directs radiation energy to heat the injector while the fuel is being injected. The radiation provided to the heat fuel may be provided throughout the engine cycle (e.g., during the intake stroke prior to fuel injection) in order to maintain the cylinder and/or injector at a sufficient temperature to efficiently vaporize the fuel. However, in other embodiments, the radiation may only be provided during or immediately following fuel injection in order to provide a discrete pulse of energy to vaporize the fuel. In this way, only the energy needed to vaporize the fuel may be provided, and excess energy expenditure may be avoided.

Once the fuel is injected, whether it is heated by the external heat source at 506 or whether it is not heated by the external heat source at 510, the injected fuel is ignited via the spark ignition system at 508, and then method 500 exits.

In addition to cold engine starts, heating the fuel by an external fuel heat source may advantageous to vaporize fuel in other operating conditions, particularly other start conditions. Such conditions may include automatic engine starts following an idle stop, or engine starts including injection with a fuel having a high percentage of ethanol, etc.

Figure 6:
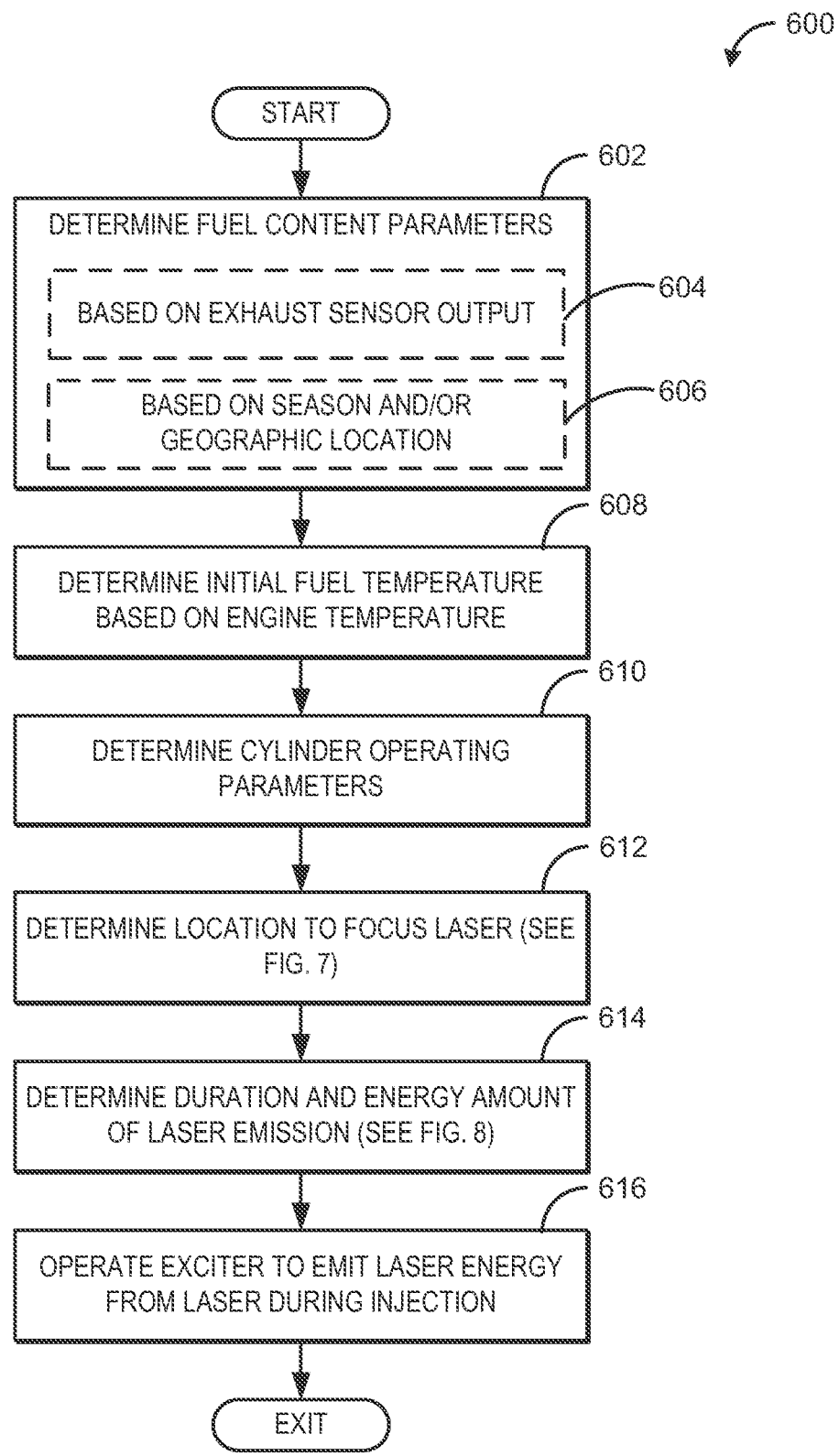
FIG. 6 shows a flow chart illustrating a method for operating a laser heating system according to an embodiment of the present disclosure.

As explained previously, the external fuel heat source may be a laser heating system, or in other embodiments, it may be a laser heater. FIG. 6 illustrates a method 600 for vaporizing fuel using a laser heating system coupled to the cylinder, such as the laser heating system described with respect to FIG. 2. Method 600 may be carried out by controller 12 as part of method 500, described with respect to FIG. 5, if it is determined the fuel is to be heated with an external fuel heat source.

Method 600 comprises, at 602, determining fuel content parameters. The injected fuel in an engine may vary in its composition, depending on a number of factors. For example, in some geographic regions, the fuel available during tank refill may be of lower octane than in other geographic regions. Further, some fuels may contain only gasoline, while other fuels may be blends of gasoline and ethanol, for example. Additionally, fuel blends may vary depending on the time of year, such as the season, as the performance needs of the fuel may change as the ambient temperature changes. These varying fuel parameters may alter the vaporization point of the fuel, as ethanol has a higher vaporization temperature than conventional gasoline, for example. As such, when heating the fuel using the laser heating system, the parameters of the fuel may be considered when determining the amount and/or duration of laser energy needed to vaporize the fuel without ignition. Determining the fuel content parameters may include determining the fuel content parameters based on exhaust sensor output at 604. An exhaust sensor, such as sensor 126, may be configured to send a signal to the controller that may be used to measure the ethanol content of the fuel. For example, by determining the fraction of oxygen molecules in the exhaust that are derived from water, the ethanol content of the fuel may be determined. In addition, the fuel content parameters may be determined based on the time of year (e.g., season) and/or geographic location at 606.

At 608, the initial temperature of the fuel may be determined based on engine temperature. The initial temperature of the fuel may be the temperature of the fuel prior to injection, as estimated by the overall engine temperature.

The laser heating system may be configured to direct a beam of laser energy in the area of the cylinder where the fuel exits the injector. The direction the fuel travels upon injection, the level of mixing of the fuel with the intake air, and the temperature of the fuel and of the cylinder may all affect the efficiency of the fuel vaporization. As such, the laser heating system may be configured to adjust one or more parameters, such as a focus location of the laser, based on cylinder operating parameters, in order to effectively vaporize the injected fuel. To do so, the cylinder operating parameters are determined at 610. The cylinder operating parameters may include the ignition timing, camshaft position, piston position, charge motion control valve position, throttle position, etc. These cylinder operating parameters may be determined relative to the fuel injection, e.g. they may be determined at a time point immediately prior to or during the fuel injection.

At 612, the focus location of the laser is determined, based on the cylinder operating parameters. Determining the focus location of the laser will be described in more detail below with respect to FIG. 7. At 614, the duration and amount of laser energy to be emitted by the laser heating system is determined based on the fuel temperature, fuel parameters, and cylinder operating parameters, as will be described in more detail below with respect to FIG. 8. At 616, the laser exciter is operated to emit laser energy at the determined location, for the determined duration, during fuel injection.

Because the fuel vaporization and mixing may be affected by cylinder operating parameters, such as cylinder pressure, the location and duration of the provided laser energy, as well as the amount of laser energy, provided by the laser heating system may be adjusted based on cylinder operating parameters, as described below with respect to FIGS. 7-8.

Figure 7:
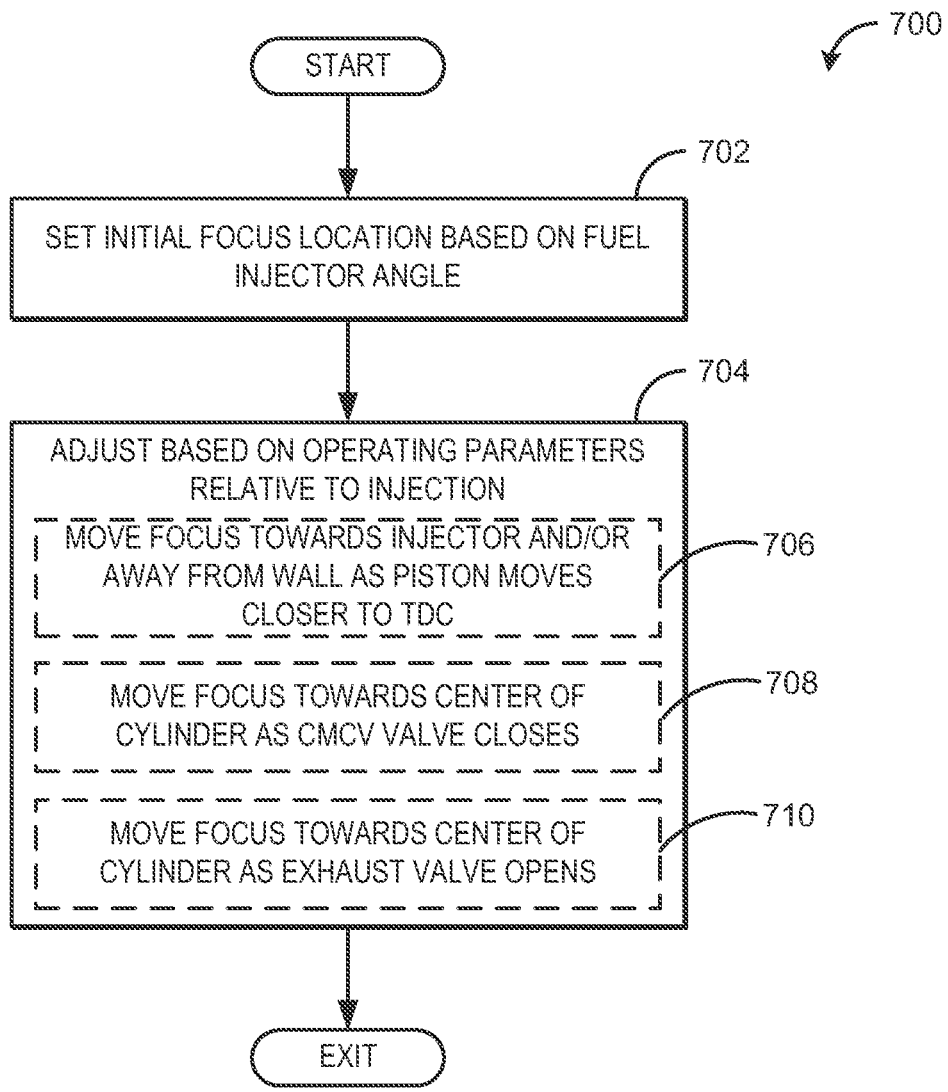
FIG. 7 shows a flow chart illustrating a method for determining a laser focus location according to an embodiment of the present disclosure.

FIG. 7 illustrates a method 700 for determining a focus location of the laser heating system. Method 700 may be carried out by controller 12 during the execution of method 600, in order to determine the laser focus location, for example, at 612. Method 700 includes, at 702, setting an initial focus location based on the position and angle of the fuel injector. The initial focus location may be the default location that is predetermined at the time of vehicle manufacture, as the position and angle of the injector are not likely to change. The focus location of the laser may be initially set to a position adjacent to where the fuel exits the injector, in order to vaporize the fuel as it is injected and before it is dispersed and mixed with the intake air. However, various cylinder operating parameters may affect the angle at which the fuel exits the injector, the direction it travels once injected, how quickly it disperses, etc., which may all impact the efficiency of fuel vaporization.

In order to account for the changes to the path the fuel takes once exiting the injector caused by the above described cylinder operating parameters, method 700 includes adjusting the focus location based on operating parameters relative to fuel injection at 704. Adjusting the focus location may include moving the focus location towards the injector and/or away from the cylinder wall as the piston position moves closer to TDC at 706. As the piston travels upward during the compression stroke, the cylinder pressure increases, and may increase enough to disrupt the flow path of the injected fuel. As such, the laser focus position may be adjusted to be closer to the initial injection location, as the cylinder pressure may prevent dispersion of the fuel beyond the initial injection point. The focus location of the laser may be adjusted based on fuel injection timing relative to piston position, e.g., during an early fuel injection event, the fuel may be injected further from the piston (as the piston is further from TDC), and during a late fuel injection event, the fuel may be injected closer to the piston. In still another example, the focus location may be adjusted depending on the fuel injection timing.

Adjusting the focus location may include moving the focus towards the center of the cylinder as the charge motion control valve (CMCV) closes at 708. The CMCV is configured to create additional swirl and tumble of the intake air in the cylinder when closed, particularly during low engine speeds and loads. The additional swirl may move the fuel closer to the center of the cylinder and the focus location may be adjusted accordingly.

Adjusting the focus location may include moving the focus towards the center of the cylinder as an exhaust valve opens at 710. An open exhaust valve may cause air to move towards the exhaust passage, and result in the fuel dispersing more toward the center of the cylinder, and thus the focus location of the laser may be adjusted to compensate.

The example adjustments to the focus location based on the cylinder parameters presented herein are not limiting. Other cylinder parameters that may alter the flow of the fuel once injected include the position of the throttle, position of an intake valve, etc. Furthermore, each of the listed cylinder operating parameters may occur in various combination, for example, the CMCV may be closed and the piston may be close to TDC at the same time (e.g., during fuel injection) and as such, the focus location may be based on both of these parameters. In such circumstances, the cylinder pressure may alter the downward flow of the fuel, but the increased swirl may offset it. The focus position may be located halfway between the positions determined for each parameter individually, or adjusted in another suitable way. In some embodiments, the focus location of the laser may be set just prior to fuel injection, and may not change once set. In other embodiments, the focus location may be set prior to fuel injection and then change during or immediately following the fuel injection, in order to follow the fuel path as it changes due to changing cylinder operating parameters.

Figure 8:
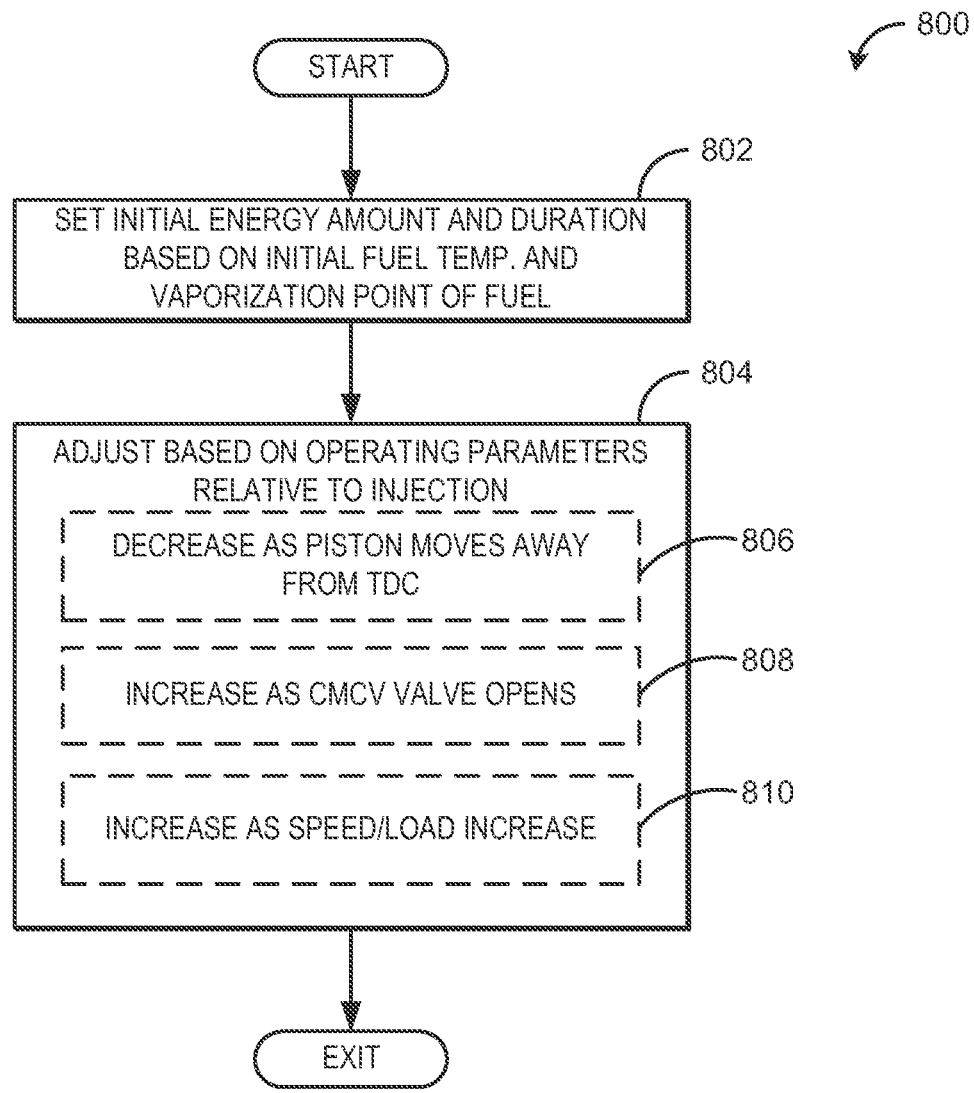
FIG. 8 shows a flow chart illustrating a method for determining a laser energy amount and duration according to an embodiment of the present disclosure.

FIG. 8 illustrates a method 800 for determining an amount and/or duration of laser energy provided by the laser heating system. Method 800 may be carried out by controller 12 during the execution of method 600, in order to determine the laser energy amount and duration, for example, at 614. Method 800 includes, at 802, setting an initial energy amount and duration based on the initial fuel temperature and vaporization point of the fuel. For example, a difference between the vaporization temperature and initial temperature of the fuel may be determined, and the amount of laser energy provided, and the duration, may be set based on this difference, such that the temperature of the injected fuel may increased to the vaporization point, without exceeding it.

Similar to the operating parameters that may affect the fuel path as described above with respect to FIG. 7, cylinder operating parameters may also affect the amount of energy required to vaporize the fuel without ignition. Thus, at 804, the amount and/or duration of laser energy provided by the laser heating system may be adjusted based on operating parameters relative to fuel injection. At 806, the amount of energy provided may be decreased as the piston position moves closer to TDC. The closer the piston is to TDC, the more pressure builds in the cylinder. As a result, the temperature of the air in the cylinder may increase, increasing the temperature of the fuel as it is injected. Thus, less laser energy may be required to vaporize the fuel. At 808, the amount of laser energy provided by the laser heating system may be increased as the CMCV opens. The CMCV tends to open when engine speed and/or load increase, as the amount of intake air reaching the cylinder increases. Due to the increased amount of intake air, the temperature of the cylinder may drop. Further, the amount of injected fuel may increase as load increases. Thus, the amount of laser energy provided may be increased to vaporize the fuel. Similarly, at 810, the amount of laser energy provided may be increased as engine speed and load increase.

Thus, the methods described above with respect to FIGS. 5-8 provide for heating fuel during injection into a cylinder using a laser heating system. The amount of laser energy provided to heat the fuel may be based on the initial temperature of the fuel and the vaporization point of the fuel, and may be directed to a location in the cylinder based on a position of the fuel injector. The amount of energy provided and focus location may be adjusted based on operating parameters such as piston position, CMCV position, etc., relative to fuel injection timing. Once the fuel is injected, it may be vaporized by the laser heating system and mixed with the air in the cylinder, providing a fuel/air mixture that may be ignited by a spark ignition system.

As such, operation of the laser, such as the timing and intensity of heating for vaporizing the fuel, may be adjusted based on the fuel injection timing relative to crankshaft and/or piston position. In one example, laser heating may commence earlier relative to TDC of the intake stroke, and for a shorter duration, during intake stroke injection; whereas the laser heating may commence later relative to TDC of the intake stroke, and for a longer duration, during compression stroke injection. In another example, the timing of the laser heating may be adjusted based on fuel injection timing relative to intake and/or exhaust valve opening timing. In one embodiment, laser heating may begin at an earlier time relative to fuel injection if an intake valve is open during injection, or may begin at a later time relative to fuel injection if an exhaust valve is open. In some embodiments, the laser heating may commence after fuel injection has started and end after fuel injection is finished but before spark injection.

Further, in some embodiments, the timing and/or intensity of the laser heating may be adjusted based on a fuel alcohol composition of the injected fuel. For example, if the injected fuel has a relatively high alcohol content, the laser heating may commence earlier relative to injection timing than if the fuel has a lower alcohol content. Also for high alcohol content fuels, the intensity of the laser heating, and the duration of the laser heating, may be increased relative to lower alcohol content fuels.

Figure 9:
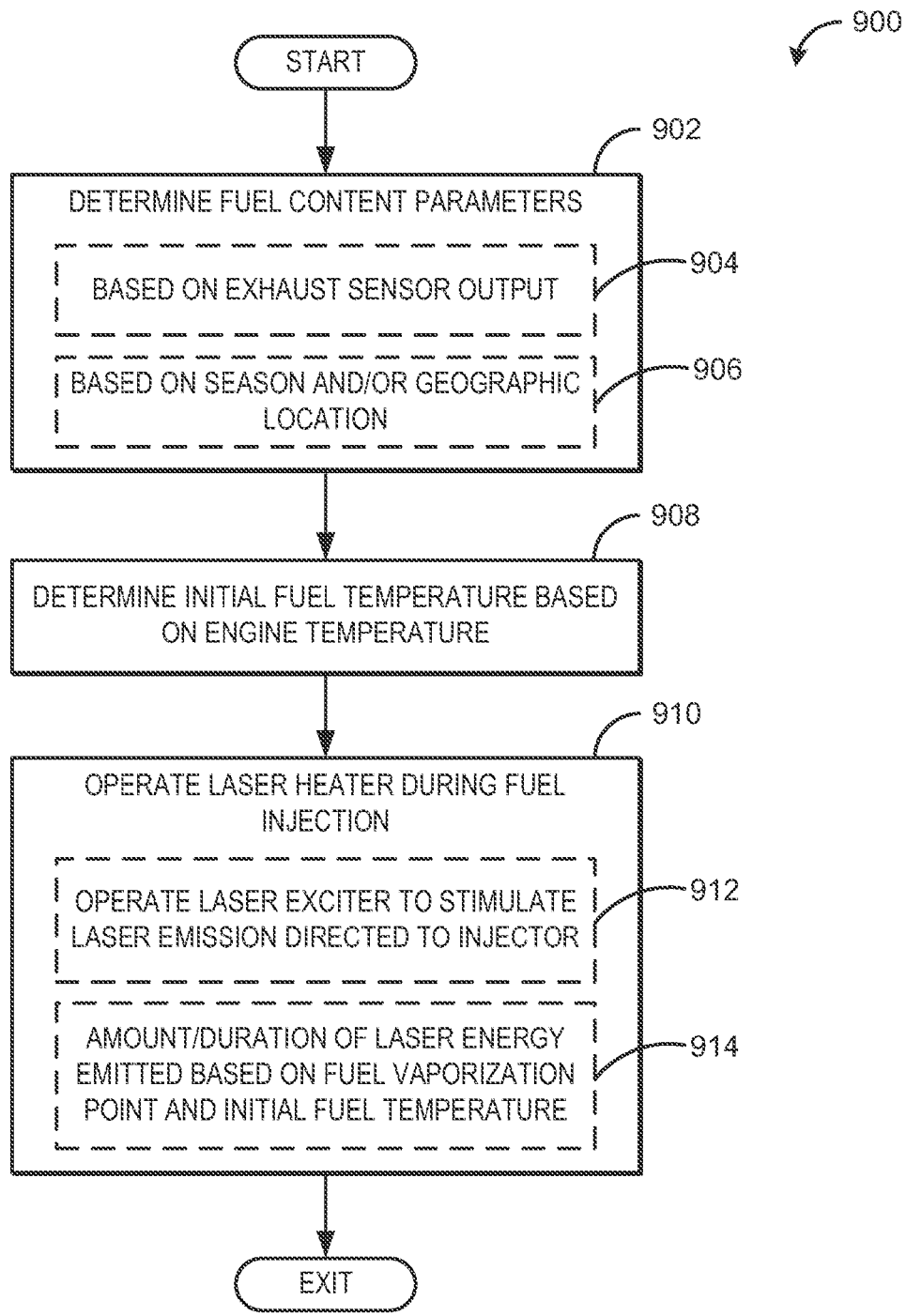
FIG. 9 shows a flow chart illustrating a method for operating a laser heater according to an embodiment of the present disclosure.

In another embodiment, the fuel may be heated by a laser heater coupled to the fuel injector that directs laser energy to the injector to heat the fuel as it is injected. FIG. 9 illustrates a method 900 for vaporizing fuel using a laser heater coupled to an injector, such as the laser heater described with respect to FIG. 3. Method 900 may be carried out by controller 12 as part of method 500, described with respect to FIG. 5, if it is determined the fuel is to be heated with an external fuel source.

At 902, method 900 includes determining fuel content parameters. Similar to 602 of method 600 described with respect to FIG. 6, determining the fuel content parameters may include determining the fuel content parameters based on exhaust sensor output at 904 and/or the fuel content parameters may be determined based on the season and/or geographic location at 906.

At 908, the initial temperature of the fuel may be determined based on engine temperature. The initial temperature of the fuel may be the temperature of the fuel prior to injection, as estimated by the overall engine temperature, similar to 608 of method 600.

At 910, the laser heater is operated during fuel injection. Operating the laser heater may include operating the laser exciter to stimulate laser emission that is directed to the fuel injector at 912. The amount and/or duration of the laser energy that is emitted may be based on the previously determined fuel vaporization point and initial fuel temperature at 914. For example, a difference between the vaporization temperature and initial temperature may be determined, and the amount of laser energy provided, and the duration, may be set based on this difference, such that the temperature of the injected fuel may increased to the vaporization point, without exceeding it. However, in some embodiments, the fuel may be heated by the laser heater to a temperature just below the vaporization point in order to avoid the presence of fuel vapors in the injector.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for vaporizing fuel, comprising:
   heating the fuel in a cylinder of an engine via radiation to vaporize the fuel without ignition, the heating via a laser heater positioned around a direct fuel injector of the cylinder,
   wherein an amount and duration of laser energy of the laser heater is adjusted based on a fuel vaporization point and an initial fuel temperature.

2. The method of claim 1, further comprising igniting the fuel in the cylinder with spark ignition.

3. The method of claim 2, wherein the laser heater directs laser energy to a tip of the direct fuel injector where the fuel is released.

4. The method of claim 1, further comprising adjusting a focus location of the laser heater based on a fuel injection timing relative to a position of a charge motion control valve.

5. The method of claim 1, further comprising adjusting a focus location of the laser heater based on a fuel injection timing relative to a piston position.

6. The method of claim 1, further comprising adjusting a focus location of the laser heater based on a fuel injection timing relative to an intake and/or exhaust valve position.

7. A method for vaporizing fuel, comprising:
   heating the fuel in a cylinder of an engine via radiation to vaporize the fuel without ignition, the heating via a laser heater positioned around a direct fuel injector of the cylinder; and
   adjusting a timing of the laser heating based on a fuel injection timing relative to an intake and exhaust valve opening timing.

8. The method of claim 1, further comprising adjusting a timing or intensity of the laser heating based on a fuel alcohol composition of the injected fuel.

9. The method of claim 1, further comprising adjusting a timing of the laser heating based on a fuel injection timing relative to a piston position, the laser heating starting after a start of fuel injection but ending after an ending of fuel injection but before spark timing.

10. The method of claim 1, further comprising adjusting an intensity of the laser heating based on a fuel injection timing relative to a piston stroke.

11. A method for heating fuel in a cylinder of an engine, comprising:
    directing a laser beam to one or more positions of the cylinder during fuel injection to vaporize the fuel;
    igniting the fuel via spark ignition, the laser beam positioned around a direct fuel injector of the cylinder; and
    adjusting an amount of directed laser energy based on fuel composition.

12. The method of claim 11, wherein directing the laser beam to one or more positions of the cylinder further comprises directing the laser beam to one or more positions of the cylinder based on a fuel injection timing relative to a piston position.

13. The method of claim 11, wherein directing the laser beam to one or more positions of the cylinder further comprises directing the laser beam to one or more positions of the cylinder based on a fuel injection timing relative to a charge motion control valve position.

14. The method of claim 11, further comprising adjusting the amount of directed laser energy based on engine temperature.

15. A system for an engine, comprising:
    a cylinder;
    a direct injector coupled to the cylinder;
    a laser positioned around the direct fuel injector of the cylinder, the laser configured to direct laser energy to a tip of the injector where fuel is released; and
    a controller having a non-transitory computer readable storage medium including instructions to:
        operate a laser exciter coupled to the laser to provide laser energy to vaporize injected fuel responsive to engine temperature during a cold engine start;
        ignite the vaporized fuel via a spark ignition system; and
        increase a duration of emitted laser energy as engine speed and load increase.

16. The system of claim 15, wherein the controller has further instructions to move a focus location of the laser energy towards a center of the cylinder as a charge motion control valve closes.

17. The system of claim 15, wherein the controller has further instructions to move a focus location of the laser energy towards the injector as a piston of the cylinder moves closer to TDC relative to fuel injection.

18. The system of claim 15, wherein the controller has further instructions to move a focus location of the laser energy towards a center of the cylinder as an exhaust valve of the cylinder opens.

19. The system of claim 15, wherein the controller has further instructions to increase the duration of emitted laser energy as a charge motion control valve closes.

20. The system of claim 15, wherein the controller has further instructions to decrease the duration of emitted laser energy as a piston of the cylinder moves closer to TDC relative to fuel injection.

* * * * *